J. G. A. KITCHEN & I. H. STOREY.
PNEUMATIC TIRE.
APPLICATION FILED DEC. 12, 1910.
1,011,901.
Patented Dec. 19, 1911.
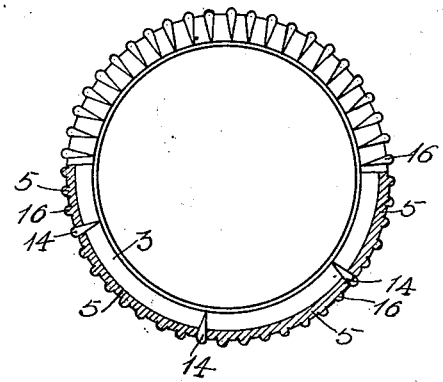
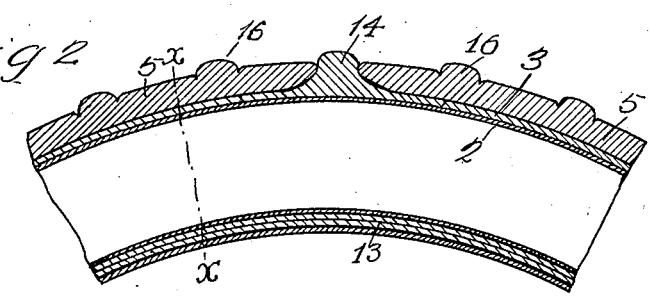
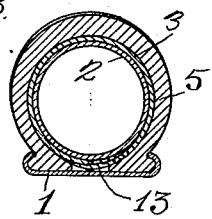
Witnesses:
Inventors
John G. A. Kitchen
Isaac H. Storey
by B. Singu
Attorney
COLUMBIA PLANOGRAPH CO., WASHINGTON, D. C.

UNITED STATES PATENT OFFICE.

JOHN GEORGE AULSEBROOK KITCHEN, OF LANCASTER, AND ISAAC HENRY STOREY, OF AMBLESIDE, ENGLAND.

PNEUMATIC TIRE.

1,011,901. Specification of Letters Patent. Patented Dec. 19, 1911.

Application filed December 12, 1910. Serial No. 596,908.

*To all whom it may concern:*

Be it known that we, JOHN GEORGE AULSEBROOK KITCHEN and ISAAC HENRY STOREY, subjects of the King of Great Britain and Ireland, residing, respectively, at Lancaster, in the county of Lancaster, and at Ambleside, in the county of Westmoreland, England, have invented certain new and useful Improvements in Pneumatic Tires, of which the following is a specification.

This invention relates to an improvement in the kind of tire described and claimed in the specification of Letters Patent of the United States No. 948701 of February 8th, A. D. 1910, granted to us.

The improvement consists in dispensing with the short internal segments formed with transverse ridges fitting between the principal segments composing the tire cover, and using instead thereof a continuous annular sleeve inclosing the air tube and formed with transverse ridges at equal distances apart, between each pair of which one of the principal segments fits, the object of the invention being to facilitate the putting together of the tire.

On the drawing Figure 1 shows an elevation of the improved tire, the lower half being in section as regards the jacket or tread part; Fig. 2 a longitudinal section of a part of the tire on an enlarged scale and Fig. 3 a cross section at line $x$, $x$, of Fig. 2.

In the tire illustrated by the figures there is a continuous annular sleeve 3 having a loose scarfed or overlapping joint 13 at one part, preferably at the base. This sleeve is made of suitable rubber proofed fabric and surrounds the air tube 2. On the crown of the sleeve transverse ridges 14 are formed preferably of india rubber. In applying the air tube 2 to the rim, it is first inclosed in the sleeve and the stem of the valve (not shown on the drawing) is passed through holes in the overlapping parts of the joint and then the two are passed over the edge of the rim and into the channel thereof together.

The tread part of the tire or the jacket is made of any convenient number of segments or sections, 5, for instance six as shown in Fig. 1. Ridges marked 16 may be formed on the segments so as to correspond with the ridges 14 on the sleeve. The segments may however be plain without any ridges and the ridges 14 formed level with the surface of the segments. The segments are shown fitted to an ordinary rim 1 with turned in edges, such as is used with the ordinary or standard tires. The inside edges of the segments around the crown are preferably rounded off and somewhat bell-mouthed and the ridges 14 are formed with shoulders of corresponding shape. The ends of the segments are also covered with india rubber so that a tight joint may be obtained between them and the ridges when the tire is inflated. The ridges are spaced at equal intervals apart and the segments are made to fit each one between two ridges. Ordinary security bolts such as 12 may be used, one to each segment, but these are generally not necessary.

In order to facilitate the building up of the tread segments upon the wheel rim, the sleeve may be molded so as to curl up laterally and thereby it will occupy the minimum space while the segments are one by one applied to the rim.

We claim as our invention:

In a pneumatic tire, the combination with a wheel rim and inner-tube, of a continuous annular sleeve adapted to receive said inner-tube and having spaced apart transverse ridges forming a part of the tread of the tire, and tread segments adapted to fit over said sleeve, between every pair of ridges thereof, the segments being separately attachable to the wheel rim.

In testimony whereof we have hereunto set our hands in the presence of two witnesses.

JOHN GEORGE AULSEBROOK KITCHEN.
ISAAC HENRY STOREY.

Witnesses:
JAMES HARRISON SHEPHERD,
ROBERT WILSON HOWSON.

---

Copies of this patent may be obtained for five cents each, by addressing the "Commissioner of Patents, Washington, D. C."